United States Patent

Ichikawa

[11] Patent Number: 5,916,639
[45] Date of Patent: Jun. 29, 1999

[54] PRIMER COMPOSITION FOR POWDER COATING

[75] Inventor: Haruo Ichikawa, Hyogo, Japan

[73] Assignee: Daicel Huels Ltd., Tokyo, Japan

[21] Appl. No.: 08/687,344

[22] PCT Filed: Jul. 10, 1995

[86] PCT No.: PCT/JP95/01371

§ 371 Date: Aug. 1, 1996

§ 102(e) Date: Aug. 1, 1996

[87] PCT Pub. No.: WO97/03134

PCT Pub. Date: Jan. 30, 1997

[51] Int. Cl.⁶ .............. B05D 1/04; B05D 1/22; B05D 1/38; B05D 7/14
[52] U.S. Cl. .......... 427/458; 427/185; 427/202; 427/409; 427/470
[58] Field of Search .................. 427/409, 195, 427/202, 185, 458, 459, 461, 470

[56] References Cited

U.S. PATENT DOCUMENTS

| | | | |
|---|---|---|---|
| 3,716,506 | 2/1973 | Simms et al. | 260/22 CB |
| 4,062,997 | 12/1977 | Hotta et al. | 427/318 |
| 4,143,012 | 3/1979 | Verma | 260/23 ST |
| 4,224,379 | 9/1980 | Ichinose et al. | 427/388.1 |
| 4,427,823 | 1/1984 | Inagaki et al. | 524/833 |
| 4,564,648 | 1/1986 | Huybrechts et al. | 523/423 |
| 4,756,975 | 7/1988 | Fujii et al. | 427/195 |
| 4,789,566 | 12/1988 | Tatsuno et al. | 427/195 |
| 4,983,454 | 1/1991 | Hiraki et al. | 427/409 |
| 5,275,848 | 1/1994 | Mito et al. | 427/409 |
| 5,432,005 | 7/1995 | Tanigami et al. | 428/414 |
| 5,552,228 | 9/1996 | Fong | 427/385.5 |

FOREIGN PATENT DOCUMENTS

| | | |
|---|---|---|
| 51-35488 | 10/1976 | Japan . |
| 1174638 | 12/1969 | United Kingdom . |

OTHER PUBLICATIONS

Chemical Abstracts, vol. 96, No. 14, Apr. 5, 1982, Abstract No. 105910.

*Primary Examiner*—Diana Dudash
*Attorney, Agent, or Firm*—Birch, Stewart, Kolasch & Birch, LLP

[57] ABSTRACT

An emulsion type primer for powder coating, which is pollution-free and excellent in safety, achieves a good adhesion between a metallic material and a synthetic resin coating and contains water as a medium, and a process for producing a metallic material coated with a synthetic resin by using this primer.

This primer comprises an acid-modified diene polymer, an organic amine or ammonia and water.

A metallic material coated with a synthetic resin is produced by applying the primer composition onto the metallic surface, curing the same by baking and then coating it with the synthetic resin by the fluidized bed dip coating method or the electrostatic coating method.

1 Claim, No Drawings

5,916,639

PRIMER COMPOSITION FOR POWDER COATING

FIELD OF THE INVENTION

This invention relates to a process for producing a metallic material coated with a synthetic resin, which is not only excellent in decorative coating, corrosion protection, electric insulation, wear resistance and weatherability but also highly improved in the adhesion between the metallic material and the coating, by coating the surface of a metallic material in the form of a pipe, a filament, a rod, a plate, etc. with a synthetic resin such as a thermoplastic resin or a thermosetting resin via a specific primer. The present invention also relates to a primer composition for powder coating.

RELATED ART

As primers for powder coating with thermoplastic powders, in particular, nylon powders, there have been already employed compounds obtained by polymerizing diene compounds such as polybutadiene. After being applied and dried, these primers are baked in a high-temperature oven. Accordingly, there have been employed primers containing halogenated hydrocarbons such as trichloroethane as a medium from the viewpoints of dryability and fire prevention. To meet the demands of the times to protect the ozone layer from the standpoint of the global environment, however, there arises a trend of restrictions on the use of halogenated hydrocarbons such as trichloroethane and chlorofluorocarbons. Although it has been proposed to use lower aliphatic or aromatic hydrocarbons as substitutes therefor, these compounds suffer from a number of problems in disaster prevention and working environments, for example, a low flash point and a toxic effect on the human body.

The present inventor has invented a primer which contains water as a medium and is superior in adhesion to the conventional products by mixing a partly acid-modified diene polymer with an organic amine or ammonia. Because of the use of water as a medium, this primer can solve the problems relating to disaster prevention and working environments with a single stroke.

DISCLOSURE OF THE INVENTION

Accordingly, the present invention provides a primer composition for powder coating, which contains water as a medium, prepared by mixing an acid-modified diene polymer with an organic amine or ammonia and a process for producing a synthetic resin-coated metallic material characterized by applying the above-mentioned primer composition for powder coating onto a metallic surface, curing and baking the same and then coating it with a synthetic resin by a fluidized bed dip coating method or the electrostatic coating method. The term "acid-modified diene polymer" as used herein means a polymer obtained by copolymerizing a compound having a conjugated double bond (for example, butadiene or isoprene) with a compound such as acrylic acid, methacrylic acid or maleic anhydride or polymerizing a compound having a conjugated double bond and then treating the polymer thus obtained with, for example, maleic anhydride.

In other words, the present invention relates to a primer composition for powder coating which comprises an acid-modified diene polymer, an organic amine or ammonia and water or a process for producing a metallic material coated with a synthetic resin, which involves the step of applying the above-mentioned primer composition for powder coating onto the metallic surface, the step of curing the same by heating, and the step of coating it with a synthetic resin by a fluidized bed dip coating method or an electrostatic coating method.

It is preferable to mix the components at a ratio of from 5 to 50 parts by weight (still preferably from 15 to 30 parts) of the organic amine or ammonia and from 300 to 1,500 parts by weight (still preferably from 400 to 900 parts) of water per 100 parts by weight of the acid-modified diene polymer. When the mixing ratio lies within the range as defined above, the present invention can be preferably embodied while considering stable dispersion, shortening of drying time and an appropriate concentration of solid matter.

In the present invention, the carboxylic acid unit is introduced into the polymer in order to disperse the diene polymer in water. It is desirable that the carboxylic acid is introduced in such an amount as to give an acid value of from 5 to 500 mgKOH/g. When the acid value is lower than 5 mgKOH/g, the salt, which has been formed by mixing the polymer with an amine, shows only a low solubility in water and thus no stable aqueous solution can be formed. On the other hand, it is difficult to prepare an acid-modified diene polymer having an acid value exceeding 500 mgKOH/g. In such a case, furthermore, the primer coating layer has an unnecessarily high hydrophilic nature, which deteriorates the adhesion to the synthetic resin coating layer, in particular, after the treatment with hot water.

The acid-modified diene polymer to be used in the present invention has a molecular weight of at least 500, preferably from about 1,000 to 5,000. When the molecular weight of this polymer is excessively low, only an insufficient adhesion can be achieved. On the other hand, an excessively high molecular weight makes the resulting solution highly viscous, which brings about a fear that the application ratio would exceed the appropriate level. The appropriate ratio of the application of the acid-modified diene polymer to an iron plate ranges from about 0.2 to 1.2 mg/cm$^2$, preferably from 0.3 to 0.8 mg/cm$^2$.

In the present invention, the organic amine is used to form an amine salt together with the carboxyl group in the acid-modified diene polymer, and to thereby give water-solubility. The salt thus formed decomposes in the step of baking and thus forms the original organic amine again, and then eliminated from the system. Therefore, the organic amine to be used in the present invention is not particularly restricted, so long as it is a commercially available organic amine having a low molecular weight. Examples thereof include allylamines, isopropylamines, ethylamines, isobutylamines, n-butylamines, sec-butylamines, t-butylamines, propylamines, 2-ethylhexylamines, morpholines, pyridines, piperidines, piperazines, amino alcohols, and anilines. In addition, ammonia can be used therefor.

The primer of the present invention, which contains water as a medium, may further contain other components. For example, ethyl cellosolve, butyl cellosolve, etc. may be used therein as an auxiliary for improving the smoothness and fluidity of a coating film which is formed by applying the primer onto a metal. Also, a small amount of a water-soluble rust preventive may be added to prevent excessive rusting.

It is also possible to add cobalt or manganese ions to the primer solution for acceleration of the oxidation in the baking step. It is advantageous that the cobalt or manganese ions are added in the form of a compound which can be uniformly dissolved in the primer solution containing water as a medium (for example, cobalt naphthenate or cobalt octylate). It is appropriate to add the cobalt and manganese ions in such an amount as to give a total content of from 0.05 to 1.00 part by weight, preferably from 0.2 to 0.6 part by weight, per 100 parts by weight of the acid-modified diene polymer.

The production of synthetic resin-coated metallic material by the use of the primer composition for powder coating of the present invention is carried out as follows; The primer is uniformly applied onto a metal, which has been optionally degreased and washed, by a conventional method such as dipping. Next, the primer is cured and baked onto the surface of the metallic material with the use of a heating means such as radiofrequency induction heating or an electric furnace. Then it is further coated with a synthetic resin by the fluidized bed dip coating method or the electrostatic coating method.

In the baking step, the primer thus applied is oxidized by oxygen in the atmosphere and thus gives active groups. When the baking is effected under mild conditions, these active groups are insufficiently formed. When the baking conditions are excessively severe, on the other hand, carbonization proceeds and thus the adhesive fore of the primer layer decreases. Therefore the baking temperature appropriately ranges from 250 to 400° C. The baking time varies depending on the baking temperature. For example, it is appropriate to bake the primer at 350° C. for 4 to 10 minutes.

As the synthetic resin to be used as a coating in the present invention, use can be made of a thermoplastic resin or a thermosetting resin. Particularly preferable examples thereof include polyamide, polyethylene, polyester, polyvinyl chloride and fluororesins.

As the metal to be used in the present invention, we can use various metallic materials for industrial use such as iron, steel and aluminum. It may be in various forms including a pipe, a filament, a rod, a plate, etc.

Because of the use of water as a medium, the primer composition for powder coating of the present invention is free from various global environmental problems (for example, the depletion of the ozone layer) encountered in the use of halogenated hydrocarbons such as trichloroethane and chlorofluorocarbons as a medium or various problems relating to disaster prevention and working environments encountered in the use of lower aliphatic or aromatic hydrocarbons as a medium. Thus a metallic material coated with a synthetic resin, which is superior in adhesion to the conventional ones, can be safely produced without causing any environmental pollution.

EXAMPLES

To further illustrate the present invention in greater detail, the following Examples will be given.

Examples 1 to 7

200 g of liquid polybutadiene M2000-20 (molecular weight: about 2,000, acid value: 20 mgKOH/g, mfd. by Nippon Petrochemical Co., Ltd.) was weighed and thoroughly mixed with 6.0 g of triethylamine, 60 ml of butyl cellosolve and 6.0 g of cobalt naphthenate. Then 800 ml of water was added thereto in small portions and thoroughly mixed to thereby give a primer wherein the mixture was completely dispersed in water (Example 6). Table 1 summarizes the composition ratios of the primers in other Examples.

An iron plate (72 mm×90 mm×3 mm in thickness) was subjected to rust removal and degreasing. Then each primer was applied onto this iron plate by the dipping method and dried at room temperature for about 10 minutes. Next, it was baked by heating in an electric furnace at 350° C. for 7 minutes and then dipped in a fluidized bed filled with a nylon 12 powder (Diamid Z2073) for several seconds. After being cooled in the air for 1 minute, it was cooled in water for several minutes.

The nylon-coated iron plate thus obtained was subjected to a hot-water peel test wherein it was immersed in hot-water at 95° C. for a given period of time and then the coating was peeled from iron plate with a knife. Each experiment was repeated 3 or 4 times and the results were totally evaluated. Table 1 shows the test results.

Comparative Example 1

50 g of liquid polybutadiene C-1000 (acid value, 57 mgKOH/g; molecular weight, about 1,500; mfd. by Nippon Soda Co., Ltd.) was dissolved in 50 ml of cyclohexane. Further, 10 g of a surfactant Tween 60 was added and the mixture was uniformly mixed. Then water was added while the mixture being stirred to produce an emulsion. After adding water so as to produce a total volume of 550 ml, the mixture was slowly heated for the distillation of cyclohexane.

The above-mentioned emulsion was applied onto an iron plate, which had been subjected to rust removal and degreasing in the same manner as that employed in the above Examples, dried and subjected to the heat treatment. Then it was dipped in a fluidized bed in the same manner as that employed in the above Examples and the nylon-coated iron plate thus obtained was subjected to the hot-water peel test. Table 1 shows the results.

Comparative Example 2

An iron plate was treated in the same manner as that employed in the above Examples, except using F-3 primer (trichloroethane solution, mfd. by Daicel Huels Ltd.) and dipped in a fluidized bed. The nylon-coated iron plate thus obtained was subjected to the hot-water peel test. Table 1 shows the results.

TABLE 1

| | Acid-modified polybutadiene (100 parts) | | Triethyl amine | Butyl cellosolve | Cobalt napthenate | Solid matter | Average adhesion | Hot water peel test (days) | | | |
|---|---|---|---|---|---|---|---|---|---|---|---|
| | Molecular weight | Acid value (mgKOH/g) | part | part | part | % | mg | 1 | 3 | 7 | 14 |
| Ex. 1 | 1500 | 130 | 8.0 | 30 | — | 20 | 65 | ○ | ○ | Δ | x |
| Ex. 2 | 1500 | 130 | 8.0 | 30 | 3.0 | 20 | 70 | ○ | ○ | ○ | ○ |
| Ex. 3 | 1000 | 70 | 8.0 | 30 | 3.0 | 20 | 64 | ○ | ○ | ○ | ○ |
| Ex. 4 | 1000 | 20 | 8.0 | 30 | 3.0 | 20 | 42 | ○ | ○ | ○ | ○ |
| Ex. 5 | 2000 | 80 | 8.0 | 30 | 3.0 | 20 | 94 | ○ | ○ | ○ | Δ |

TABLE 1-continued

| | Acid-modified polybutadiene (100 parts) | | Triethyl amine | Butyl cellosolve | Cobalt napthenate | Solid matter | Average adhesion | Hot water peel test (days) | | | |
|---|---|---|---|---|---|---|---|---|---|---|---|
| | Molecular weight | Acid value (mgKOH/g) | part | part | part | % | mg | 1 | 3 | 7 | 14 |
| Ex. 6 | 2000 | 20 | 8.0 | 30 | 3.0 | 20 | 53 | ○ | ○ | ○ | ○ |
| Ex. 7 | 1500 | 64 | 8.0 | 30 | 3.0 | 20 | 72 | ○ | ○ | Δ | Δ |
| Comp. Ex. 1 | 1500 | 57 | aqueous emulsion surfactant Tween 20, 2 wt. % | | | 10 | 60 | ○ | Δ | x | — |
| Comp. Ex. 2 | 3000 | — | trichloroethane | | | 10 | 93 | ○ | ○ | Δ | x |

○: not peeled.
Δ: partly peeled.
x: peeled.

I claim:

1. A process for producing a metallic material coated with a synthetic resin which comprises the steps of:
   (a) applying a coating of a primer composition directly onto a metallic surface,
   (b) curing the coating by heating, and
   (c) coating the cured primer with a synthetic resin by either a fluidized bed dip coating method or an electrostatic coating method;

wherein, the primer composition comprises 100 parts by weight of an acid-modified diene polymer, from 5 to 50 parts by weight of an organic amine or ammonia, and from 300 to 1,500 parts by weight of water; and wherein the coating is cured in step (b) of the process at a temperature of 250 to 400° Centigrade.

* * * * *